Jan. 13, 1942.　　　　R. GUYOT　　　　2,269,662
SAFETY CLIP
Filed April 16, 1941
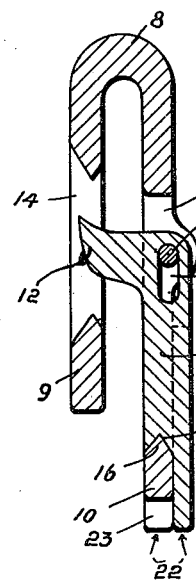
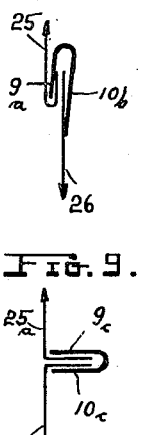
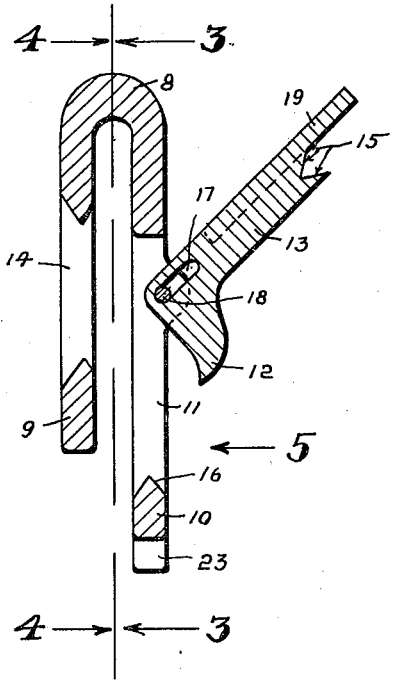
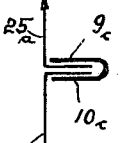
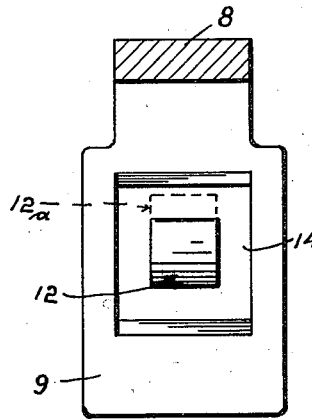
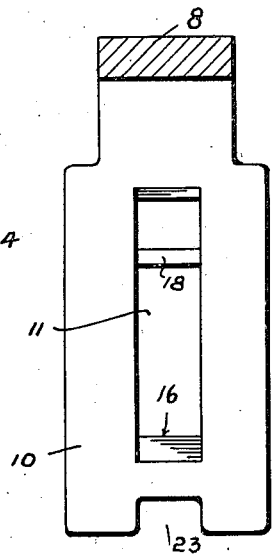
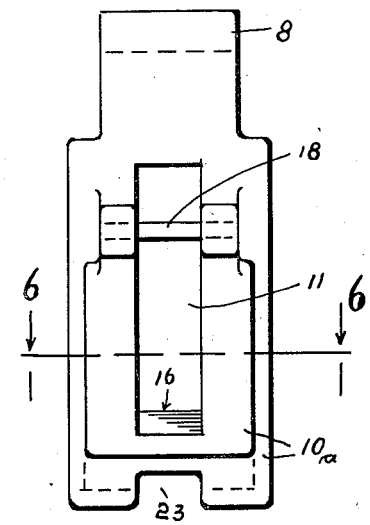
INVENTOR:
REINHARD GUYOT,
By: Arthur H. Kruger,
his Atty.

Patented Jan. 13, 1942

2,269,662

UNITED STATES PATENT OFFICE 2,269,662

SAFETY CLIP

Reinhard Guyot, Los Angeles, Calif.

Application April 16, 1941, Serial No. 388,863

5 Claims. (Cl. 24—248)

This invention relates to devices used for securely holding materials clamped in desired position or condition in cases where safety pins are generally used.

One of the objects of this invention is to provide a safety-clip that will eliminate the hazards of the so-called safety-pin but act in a similar capacity.

Another object is to provide a safety-clip with means that will maintain it in a locked position.

Another object is to provide such a safety clip with means by which it can be disengaged by a simple movement.

Another object is to provide such a safety clip with means that will just naturally bring the clip to locking position when applied to material that is to be held by the clip.

Another object is to provide such a clip with means by which an accidental unlocking is greatly eliminated.

Another object is to provide such a clip with means for locking it and maintaining it locked in such a manner that a baby is not likely to undo it while it is used in place of safety-pins on a baby-diaper.

Other objects will appear from the following description and appended claims as well as from the accompanying drawing, in which—

Fig. 1 is a general midsection of a safety-clip in a closed position, designed to function in accordance with, and embodying the invention.

Fig. 2 is a general midsection of the same clip in open position.

Fig. 3 is a section on line 3—3 of Fig. 2.

Fig. 4 is a section on line 4—4 of Fig. 2, without the locking member.

Fig. 5 is a front view of one shank of the clip as seen from the outside in the direction of the arrow 5 in Fig. 2, without the locking member, this form being of a slightly modified design over the forms illustrated in Figs. 1, 2, 3, and 4.

Fig. 6 is a cross section on line 6—6 of Fig. 5.

Fig. 7 is a cross section of a locking member of a slightly modified form, designed for co-operation with the form of shank in Figs. 5 and 6.

Figs. 8 and 9 are schematic illustrations on which to demonstrate the different functionings of shanks of unequal, or equal, length.

This new safety-clip is meant to be used for all sorts of purposes in a similar manner as the so-called safety-pin, this clip having the advantage of not puncturing any material and therefore being eventually useful even more widely.

Of course, this clip is particularly desirable with baby-wear. The size of the clip is such that a baby could hardly swallow it in the first place, but, moreover, there could not possibly be said to be any danger involved no matter what the baby might do with it.

Being particularly designed so that the clip will lock itself and maintain itself locked; the arrangement is such that the locking member will centralize itself after being applied to any material.

As illustrated, the clip consists of the back-portion 8, bifurcated in form of two shanks 9 and 10. The shanks are designed to come on opposite sides of any inserted material. There is furthermore a locking member 13 with a lug 12.

The shank 10 is provided with a cut-out 11 in which the locking member with lug is swingably mounted.

The shank 9 is provided with a cut-out 14, into which the lug projects when in locking position.

The locking member with the lug is mounted so that the lug-end becomes disposed equally spaced in all lateral directions within the cut-out 14, and, when so disposed, the notch 15 on the locking member 13 becomes engaged on the V-shaped edge 16 of the shank 10.

In order to facilitate a disengaging from this position, the locking member is provided with an elongated pivot-hole 17 by which to be shiftable on the pin 18.

In operation, the locking member may be swung back and forth around the pin 18, but, before the notch 15 can operate in relation to the edge 16, the whole locking member must be shifted in the direction of the back-portion 8 of the clip.

If and when any material is placed between the shanks 9 and 10, such material is just naturally forced by the lug 12 into, and partly through, the cut-out 14.

Being so forced as to bulge through the cut-out, the material is under a suitable stress to serve as the means by which the lug is automatically centralized within the cut-out 14. At the same time, the material will give, or yield, sufficiently to allow an engaging or disengaging of the notch with respect to the edge 16, however, requiring a forcing of the locking member in the direction of the back-portion 8 whenever such an engaging or a disengaging is to be accomplished.

Once engaged, the inserted material in its taut condition keeps the lug centralized and thereby in engaged position to require action against the tautness of the inserted material in order to get the locking member disengaged.

In Fig. 3, the lug-end has been indicated in centralized position, equally spaced within the cut-out 14 of the shank 9 of the clip. The dotted lines 12a indicate approximately the position which the locking member must attain for engaging or disengaging of the notch with respect to the edge 16. From this it will be understood that the lug 12 must be forced against the taut inserted material for such operations.

The lateral contours of the top plate of the locking member are preferably of equal outline as the lateral contours of the shank 10 so as to protect the locking member against accidental actuating.

When such edges are of equal contours, any contacting will naturally be against the edges of the shank 10 just as much as against the edges of the top-plate of the locking member 13. The illustrations of the modified form of Figs. 6 and 7 should make this feature easily clear.

In Fig. 6, the edges 20 of the shank 13a are normally in alignment with the edges 21 of the top-plate 19a, which is shown in dotted lines in Fig. 6 just for the purpose of illustrating such aligning feature; while the top-plate section is shown in full lines in Fig. 7.

In Fig. 2, the top-plate 19 is indicated as of plain flat form, to snugly come to rest on the just as flat outer surface of the shank 10 in that plain form, of which the contour-edges 22 are also made to be of flush alignment wherever they form the outer edges of the clip.

To facilitate the previously referred-to shifting movement, with respect to the notch 15 and edge 16, a comparatively small cut-out 23 is provided in the front edge of the shank 10, as indicated in Figs. 4 and 5.

This is particularly with baby-wear. A baby would hardly ever catch the top-plate of the locking member in such a manner as to allow a shifting of the locking member with respect to such cut-out 23, to thereby unlock the notch from the edge 16. The larger portions of the referred-to aligning edges would normally tend to withstand any pressure. It should be understood that the several illustrations are made abnormally thick just for the sake of allowing the showing of materials, and that in reality the materials are much thinner so that any of the aligning flush edges are so closely disposed that any grasping of one edge without the other would be practically impossible.

Only by providing the cut-out 23, and only by grasping the edge of the cover-plate of the locking-member at this point, should it be reasonably possible to shift the locking member with respect to the notch 15 and the edge 16. Accidental unlocking should therefore be not very likely.

It should be understood that this new safety-clip may be made of a great variety of materials, metals and others. Flexible, pliable, elastic, or spring-materials, nevertheless, are preferable. A great many experiments and tests had therefore been made.

Such experiments had shown that materials, such as Tenite, Lucite, Bakelite, Allite, horn, and many others, embody distinct characteristics whereby they are more or less suitable, desirable, or efficient. The use of particular materials will, however, depend on requirements under different conditions.

In application, these safety-clips may differ slightly in functioning from the safety-pins. While pins may be punctured through material so that the pin will always become disposed comparatively very much in the same manner; these safety clips, naturally, must be applied over opposite sides of material.

Unequal shanks have shown to be of great advantage in many cases, particularly with baby-wear where a diaper may have to be fastened to a shirt. The shirt produces a pull in an upward direction, as at 25 in Fig. 8, while a downward pull may be said to be produced by the diaper, as at 26. The longer shank 10b will, in such a case counteract any tipping tendency of the clip as the shank rests against the side of the diaper material, easily visualized from the schematic illustration of Fig. 8.

If the shanks of the safety-clip were of even length, the clip would just naturally have the tendency to tip over, as illustrated in Fig. 9, the opposite pulls at 25a and 26a finding no brace in either of the equal shanks 9c and 10c of this schematic illustration.

A clip with equal shanks would therefore be not very desirable since it would project away from the body to be very uncomfortable as a baby could come to rest on such a clip so disposed.

The unequal shanks, on the other hand, will always have the tendency of maintaining a flat position that can be comfortable on a body, particularly, as already stated, as such safety-clips are made as thin as possible, the showing in the drawing being merely of a thicker, or heavier type in order to allow a more distinct illustration of the different individual parts in relation to one another.

Having thus described my invention, I claim:

1. A safety-clip comprising a back-portion connecting oppositely disposed shanks between which material may be inserted for clip-joining, one shank having an aperture into which the inserted material may be depressed to be firmly engaged in the clip, a locking member swingably and shiftably mounted on the other shank and having a portion to normally project into and become centralized in the aperture in locked position for holding the inserted and depressed material against lateral displacement, and locking means between said member and its supporting shank arranged co-operatively with the shiftable mounting so that said member will unlock by a shifting movement away from said centralized position.

2. A safety-clip comprising a back-portion connecting oppositely disposed shanks between which material may be inserted for clip-holding, one shank having an aperture into which the inserted material may be depressed to be firmly engaged in the clip, the other shank having also an aperture with a supporting pin traversing the aperture and a locking edge in the far end of the aperture and facing the side of the pin, a locking member having an elongated hole for swingably and shiftably engaging said pin and having a portion to project into and become centralized in the aperture of the first-named shank for holding the inserted material in the clip against lateral displacement and having furthermore a notch for engagement with said locking edge in locking position of the locking member with respect to the clip.

3. A safety-clip comprising a back-portion connecting oppositely disposed shanks, one shank having an aperture, the other shank having a supporting pin and a locking edge parallel to the axis of the pin, and a locking member swingably and shiftably mounted on the pin and having means for engaging with the locking edge when the locking member is in locking position with respect to the apertured shank.

4. A safety-clip comprising a back-portion connecting oppositely disposed shanks, one shank having an aperture, the other shank having a supporting pin and a locking edge parallel to the axis of the pin, and a locking member with a portion projecting into and centralized within the aperture while swingably and shiftably mounted on the pin and having means for engaging with the locking edge in locking position and adapted to be unlocked by means of the shiftable mounting on the pin.

5. A safety-clip comprising a back-portion connecting oppositely disposed shanks, one shank having an aperture, the other shank having a supporting pin and a locking edge parallel to the pin, and a locking member having a portion projecting into and centralized within said aperture and having furthermore an elongated hole for swingably and shiftably engaging the member on said pin and having still furthermore means for engaging with the locking edge subject to a shifting movement preparatory for unlocking and swingably opening the locking member with respect to said aperture.

REINHARD GUYOT.